H. E. SEARS.
PIPE JOINT.
APPLICATION FILED SEPT. 26, 1917.
1,282,959.
Patented Oct. 29, 1918.
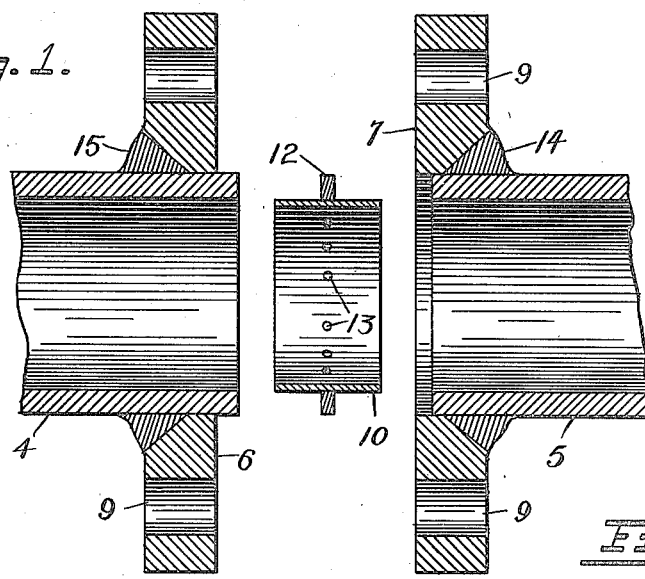
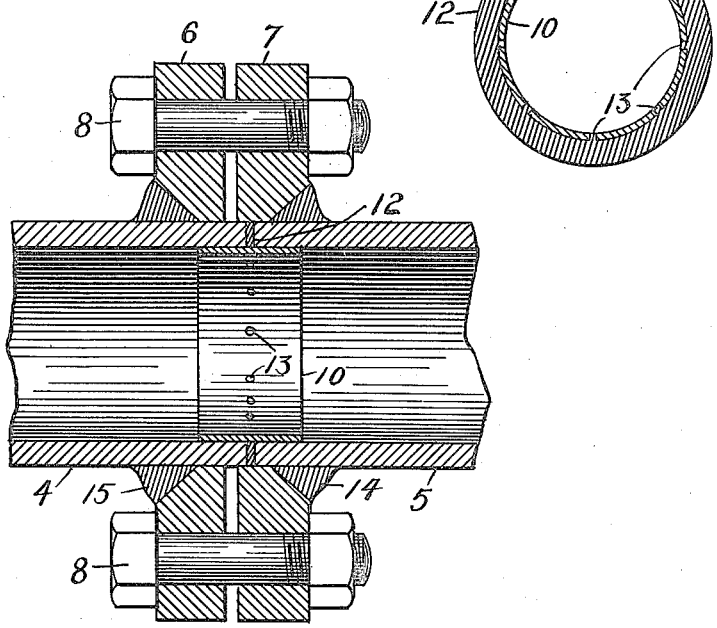
Inventor:
H. E. Sears,
By Wm H Reid, Attorney

UNITED STATES PATENT OFFICE.

HENRY E. SEARS, OF NEW YORK, N. Y.

PIPE-JOINT.

1,282,959.  Specification of Letters Patent.  Patented Oct. 29, 1918.

Application filed September 26, 1917. Serial No. 193,271.

*To all whom it may concern:*

Be it known that I, HENRY E. SEARS, a citizen of the United States, and resident of New York city, in the county of New York and State of New York, have invented certain new and useful Improvements in Pipe-Joints, of which the following is a specification.

The object of the present invention is to provide an improved means for obtaining a secure joint between two pipe members whose extremities are brought to engage a packing and tightly pressing against the same, and is held in this position by means of clamp devices secured to the pipe members; and which latter means serve to strengthen the pipe members rather than weaken the same as is done where the usual screw threaded connector serves to join the external screw threaded end portions of the pipe members.

A further object of the invention is to provide in such an arrangement, clamping means secured to the pipe end portions by a mass of hard brazing material.

Another object of the invention is to provide an improved form of coupling member that can be inserted in each of the pipes and will carry the packing ring.

In the accompanying drawing showing one embodiment of my invention, Figure 1 is a vertical section through the pipe end portions and the packing member. Fig. 2 is a similar view with the pipes secured together; and Fig. 3 is a transverse section through the coupling member.

This invention is designed to produce an end-to-end packing between the extremities of the pipe members in a joint, and to draw and clamp the pipes together to compress such packing; and to provide clamping means secured to the outside of the pipes without reducing their strength, as in the usual screw threaded arrangement.

In the drawing are shown end portions 4 and 5 of pipe members, that may be straight pipes, or other forms, such a T or an L or other forms known in the art. To each of these I secure a clamping ring. A ring 6 is shown secured to the pipe 4 and a ring 7 secured to the pipe 5, at their end portions. These rings are adapted to receive clamping means such as bolts 8 that may pass through suitable holes 9 in the rings and serve to draw the pipe members together and lock them in such position.

I also provide a packing member, shown in the form of a sleeve 10 that is of a size to be inserted into the pipes 4 and 5, and which may have a thinner wall than such pipes. At the middle portion of the sleeve I secure external ring flange 12, of suitable compressible packing material, such as lead or a composition of this nature. In Fig. 3 I show this packing flange 12 as secured to the sleeve by having lugs 13 that project into suitable holes in the sleeve. The packing ring may be cast in such position and the metal will flow into these holes to form the lugs and secure the flange to the sleeve.

When the pipes 4 and 5 are brought together with the sleeve inserted into each pipe by the portion on each side of the flange 12, the latter will engage the extremities of the pipes, as shown in Fig. 2. Thereupon the bolts 8 are inserted and tightened. This will cause a very strong compression of the packing flange engaged on its side face by the pipe extremities. The sleeve 10 will serve to guide the pipes and prevent relative lateral movement and will further act to prevent the metal of the packing from being forced inwardly into the pipes.

One of the ring members as 7 may be secured to the pipe 5 to project a short distance beyond the extremity of the pipe, as shown. This will cause the overhanging portion of the ring to surround the periphery of the packing flange 12 and which may project a short distance beyond the same, in the final position, as indicated in Fig. 2. The other clamping ring 6 is shown as secured to the pipe member 4 a short distance back of the pipe extremity, to accommodate the projection of the other ring member, and for the further reason of separating the rings in the final position to permit drawing the pipes together.

These rings 6 and 7 are preferably secured to the pipe members by special brazing means. As shown, a part of the bore of each ring, on the side opposite the pipe extremity, is cut away, and into such a channel formed between the ring and the pipe, I insert a mass of suitable hard brazing material, such as a form of iron employed for this purpose where a very high degree of heat is obtained, as by the oxyacetylene process. By such means annular masses or rings 14 and 15 are formed, that serve to intimately unite the ring with the pipe, as shown in the drawing.

By this construction the pipes are not weakened as would be the case if they were provided with external screw threads, but the brazing of these rings forms a very strong means of clamping the pipe ends together.

Such a construction is simple and economical to produce as the ordinary pipe members, either straight pipes or pipe connections, simply have the apertured rings secured thereto by brazing. The packing member is formed simply by an ordinary sleeve of iron, having an external flange at the middle portion, of lead or similar composition. It is obvious that the packing member shown herein may be employed in a pipe joint with other forms of connecting means for the pipes. It is also apparent that the form of clamping rings securely united with the pipe ends by annular masses of hard brazing material, can be used for pipe joints, with other forms of packing than that disclosed herein.

Having thus described my invention, what I claim is:—

1. In a pipe joint, the combination with a pair of pipe members, of a ring secured to the end portion of each pipe, each ring having a cylindrical bore engaging the pipe at its end portion, with such bore channeled at one side of the ring for a considerable distance, an annular mass of hard brazing material of substantially triangular form in section brazed in such channeled portion between each pipe and its ring to intimately unite the ring and pipe, one of said rings being located a short distance to the rear of the pipe end, and the other ring extending a short distance beyond its attached pipe end to permit entrance of the other pipe end, a packing member comprising a sleeve adapted to fit into each pipe bore and provided at the middle portion with an external annular flange of conpressible material that projects between the abutting pipe ends inside of one of said rings, and fastening means such as bolts engaging said rings to clamp the pipe extremities against said flange surrounding the sleeve.

2. In a pipe joint, the combination with a pair of pipe members, of a ring secured to the end portion of each, one ring projecting a short distance beyond its pipe member, a packing member comprising a sleeve adapted to fit into each pipe member and provided with a peripheral series of openings, an external flange secured to the sleeve by inwardly extending radial lugs engaging in the series of openings, said flange being located in the projecting ring, and means for securing the rings together.

HENRY E. SEARS.